Un*ited States Patent Office 3,519,290
Patented July 7, 1970

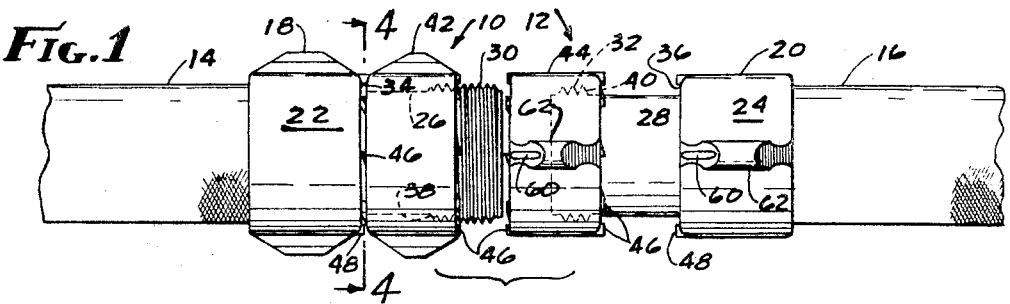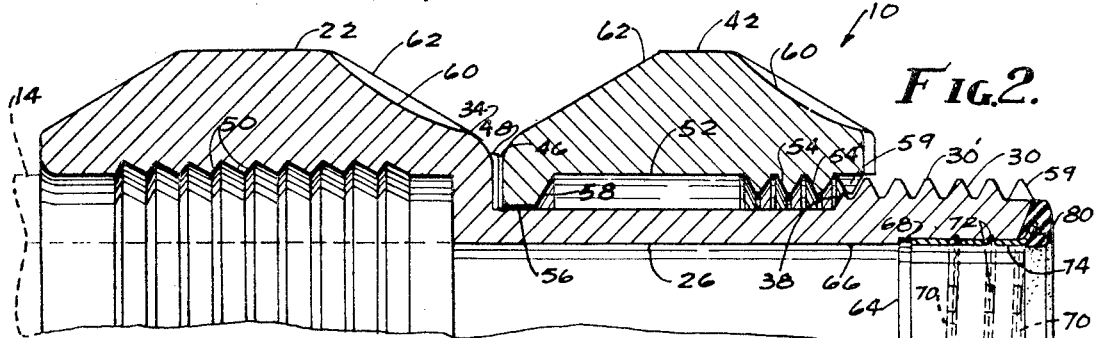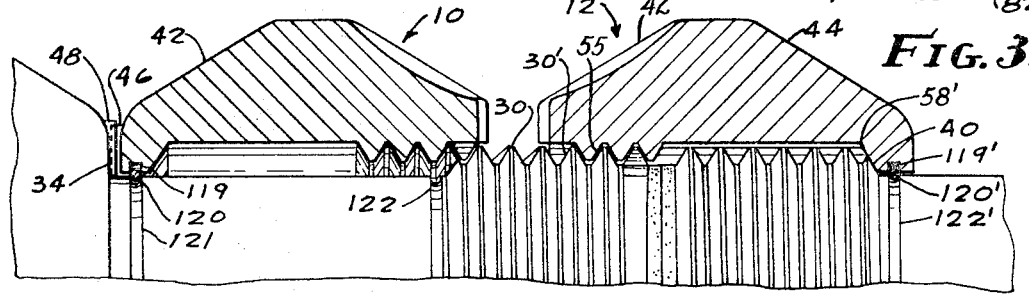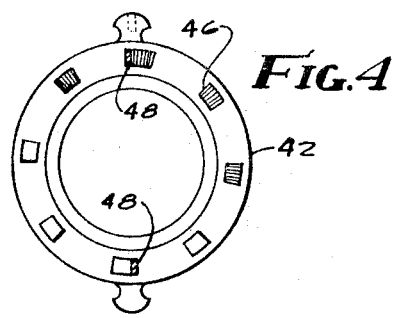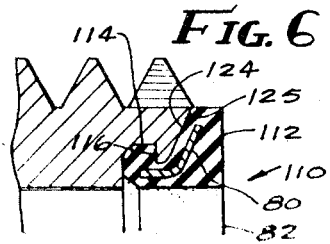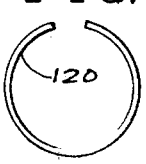

3,519,290
COUPLING AND SEAL APPARATUS FOR HOSES
AND OTHER TUBULAR CONDUITS FOR FLUIDS
Jerald V. Dunlap, 2727 Washington Ave., Santa Monica,
Calif. 90403, and James L. D. Morrison, 2045
Mandeville Canyon Road, Los Angeles, Calif. 90049
Original application Dec. 22, 1966, Ser. No. 603,862, now
Patent No. 3,427,053, dated Feb. 11, 1969. Divided
and this application July 29, 1968, Ser. No. 755,490
Int. Cl. F16l 15/00, 21/04
U.S. Cl. 285—81                                           1 Claim

ABSTRACT OF THE DISCLOSURE

A coupling and sealing apparatus includes a cylindrically shaped body and a reinforced seal secured to its forward end for sealing engagement with a substantially identical coupling body having a corresponding forward end. The body has recessed portions on its inner cylindrical surface. The seal comprises a reinforcing means having external teeth engaged within the recessed portions of the body and includes at its forward end a flaired portion. An annular rubber-like seal completely surrounds the flaired portion such that the flaired portion is imbedded in and bonded to the annular seal in such a manner that the seal covers substantially completely the forward end of the body. The coupling apparatus further includes first and second annular detent grooves and a cooperating retainer spring means for releasably engaging, alternatively, the first and second grooves.

---

This application is a division of our co-pending patent application, Ser. No. 603,862 filed Dec. 22, 1966, of the same title, now U.S. Pat. No. 3,427,053.

This invention relates generally to means for removaby coupling together lengths of flexible conduit and more particularly to such a coupling and its fluid-tight seal which is versatile to function either as an external male, or internal female, coupling half.

BACKGROUND OF THE INVENTION

Although the present invention finds particularly useful application in the field of threaded fire hose couplings for interconnecting standard lengths thereof into longer lengths for particular applications, and although in the cause of brevity and clarity of presentation, much of the following description and discussion of examples of the invention are related thereto, it is to be expressly understood that the advantages of the invention are equally well manifest in other fields wherein such connections whether threaded or quick-connect in character, are desirable such as, for example, irrigation or other water lines, naval fuel lines, industrial gas and liquid conveying, garden hose, and the like.

In the handling of conventional fire hoses including their layout between the source of water and the nozzle as well as their connections to the nozzle and the hydrant or pump, extremely valuable time is lost when it occurs that two external or two internal couplings have been placed together. The lost time results from having to reverse the length of at least one of the hoses. The problem is aggravated by the inherent emergency rushed atmosphere, as well as by factors of poor visibility due to smoke or darkness. Improper hose layout and other consequent difficulties may also arise because of the severe fatigue or excitement or danger which may be encountered by fire-fighting personnel particularly in large or difficult fires.

A further situation in which improper or impossible hose connecting may be encountered is that in which a plurality of fire companies or different squads are laying out hose in a network from a plurality of pumpers or hydrants to a plurality of nozzles, and it becomes important to intercouple lengths of hose from the different layouts. Clearly, if the attempted couplings are not properly mated, the connection will not be possible.

In addition to this character of disadvantage of the conventional external and internal type of hose couplings, it may be noted that fire companies and their hose suppliers are, of course, required at additional expense and complication to manufacture and to maintain an inventory of both types of couplings.

A prior art solution widely used at present is that of supplying double external and double internal adapters together with rigorous training of personnel in procedures in the laying on the hose; however, experience has been established that the handling of such separate and special parts in accordance with this technique is not an effective solution, and the drills and procedures for the correct laying of the hose are time consuming, bothersome and generally totally ineffective during a multiple alarm fire where hose is interconnected between companies. Furthermore, the number of disengageable connections in a composite length of fire hose is significantly increased, thereby increasing the probability of possible leaks or accidental uncoupling of the watertight joints between hose lengths; and of course all such joints must be maintained sealed during the use of the composite length of hose in spite of rough use and handling including being dropped, dragged, and run over by heavy equipment.

Some other attempts to provide an effective solution to these problems have been directed toward providing identical half couplings, but which have, heretofore not functioned properly and have either been so excessively bulky, complex, expensive, unreliable or would not mate with existing couplings so as to constitute less than a satisfactory solution for acceptance by, for example, fire companies or maritime bureaus because of such factors. As a result, no fire department in the world has accepted for general use threaded identical half hose couplings.

A particular problem exists in the successful design and development of such identical-half couplers. In hose couplings of the character for coupling and uncoupling by hand, a resilient, non metallic sealing means is generally incorporated. In conventional coupling units, this resilient seal is disposed protectedly and rententively within the internal, female, coupling half. In an identical halves coupling system, it is obvious that if the halves are truly identical and are to be matable without regard to any additional or extrinsic sealing means, the external, or male end must also be provided with non metallic sealing means. This general configuration causes the relatively soft sealing means to be exposed to abrasion, impact, dragging, tearing, and other forces of wear and tear to which conventional sealing means need never be exposed. Satisfactory solutions to the problems of providing satisfactorily durable and reliable seals which can readily and economically be installed or replaced have not heretofore been found.

It is therefore an object of the present invention to provide a coupling and a coupling system which are not subject to these and other disadvantages or limitations of the prior art.

It is another object to provide such a coupling and an exceedingly rugged, replacable seal therefore which has superior sealing qualities and which may be very easily and readily removed and inexpensively replaced quickly and without special tools.

It is another object to provide such a coupling and seal which is rugged, lightweight, compact, reliably durable over a very long service life, and inexpensive to manufacture.

It is another object to provide such apparatus which may be a universal, unitary, identical coupler-half unit adapted to be affixed to both ends of all appropriate fluid carrying lines.

It is another object to provide such apparatus which will couple readily and immediately to identical ones of each other or to either external or internal conventional hose couplings built to presently existing thread standards.

It is another object to provide such apparatus in which a swivel portion of one coupler unit is precluded from rotationally binding in a lock nut fashion against other elements of the coupler.

It is another object to provide such apparatus in which a swivel portion of one coupler half is always threadably engaged on the body of such apparatus in the external coupling position to facilitate the conversion to an internal coupling position.

It is another object to provide such apparatus in which a swivel portion of one coupler unit is disengageably secured in either the external or internal coupling positions to facilitate assembly with other couplings.

SUMMARY

Very briefly, these and other objects are achieved in accordance with the structural features of one example of the invention which includes generally cylindrical conduit coupling apparatus having a coupling body with a forward connecting portion for connection with other coupling structure which may be of like or different character. The coupling apparatus body further includes a seal retaining means disposed or formed contiguously to the inner cylindrical surface of the coupling body. Removable and replaceable integrally reinforced seal means are provided which engage the seal retaining means and seal the forward end of the coupler body to the other coupling structure when the mated coupling structures are connected together.

Further details of these and other novel features and their operation as well as additional objects and advantages of the invention will become apparent and best understood from a consideration of the following description taken in connection with the accompanying drawing which is presented by way of illustrative example only and in which:

BRIEF DESCRIPTION OF THE DRAWING

FIG. 1 is a side elevational view of an example of a pair of identical half coupling units shown ready for intercoupling and constucted in accordance with the principles of the present invention;

FIG. 2 is an enlarged longitudinal sectional view of a portion of the left-hand one of the coupling units shown in FIG. 1;

FIG. 3 is a similar view of a portion of the structure of FIG. 1 shown fully coupled together;

FIG. 4 is a cross-sectional view of the structure of FIG. 1 taken along the reference lines 4—4 thereof;

FIG. 5 and FIG. 6 are longitudinal sectional views of a portion of the structure of FIG. 1 illustrating alternative examples of a replacable seal component thereof; and FIG. 7 is an axial view of the ring shown in FIG. 2 and FIG. 3.

Briefly these and other objects are achieved in accordance with the structural aspects of one example. In general, the example of the invention shown includes a tail piece of the character to be affixed in a conventional manner to the end of a length of hose. The tail piece is formed to include a reduced diameter tubular portion extending axially concentrically away from the end affixed to the hose. The end of this tubular portion is provided with external coupling threads, the maximum diameter of which is greater than that of the remainder of the tubular portion.

The threaded end is also, provided with, in this example, a retainer channel formed about the inner periphery of the tubular end. The retaining channel is mated in a removable, or disengageable, relationship with a metal reinforced neoprene seal, the structural details of which are discussed below.

Disposed over the reduced diameter tubular portion of the coupler unit is a coupling swivel having (1) internal threads on one end for threaded engagement with the external coupling threads on the tubular portion, (2) a radially inwardly projecting retaining shoulder on the opposite end for precluding removal of the swivel past the external threaded portion of the tubular portion, and (3) an enlarged inner diameter portion between the internal threads and the retaining shoulder which is axially longer than and which radially clears the external threads of the inner tubular extension of the tail piece. Due to these relationships, as will become more clear below, the swivel may be screwed rearwardly toward the enlarged portion of the tail piece thereby exposing the externally threaded reduced diameter portion thereof to function as an external coupling unit. Alternatively, the swivel may be screwed toward the seal until its retaining shoulder engages the rear edge of the external threads on the inner tubular extension. The internal threaded swivel is then free of those threads and may be screwed over the external portion of another, separate coupling unit thereby drawing the two units into a sealed engagement.

To preclude the swivels of a mated pair of coupling units becoming bound together in a lock nut fashion with respect to the external threads of the unit, and to preclude a swivel from becoming bound against the enlarged diameter portion of its respective tail piece, each end of the swivel as well as the forward edge of the enlarged diameter tail piece are provided with short, axially extending lug portions which cause the relatively moving parts to engage each other circumferentially by direct abutment of the lug portions instead of by a gradual shearing binding engagement.

This arrangement, included in this particular example of the invention, precludes, (1) the swivels of a pair of mated coupling units, where one of the units is an identical ended coupling and the other is an existing internal coupling, from being bound together in a lock nut relation with respect to the external threads of the identical and coupling unit; (2) the external threaded portions of a pair of mated coupling units, where at least one of the units is an identical ended coupling and the other is an external coupling unit, from being bound together in a lock nut relation with respect to the joining internal threaded swivel during disengagement when the swivel accidentally is moved from a free swiveling position rearwardly into engagement with the external threads of its own coupling unit, and (3) the external starting thread jamming end to end with the internal starting thread of the swivel of the same unit thereby arresting the motion of the swivel in the before mentioned accidental movement of the swivel.

A spring wire contracting on the reduced tubular portion and cooperating with either of two shallow circumferentially extending grooves on the reduced tubular portion and carried by an annular groove in the swivel releasably secures the swivel in either the forward internal coupling position or the rearward external coupling position preventing accidental mislocation of the swivel.

To withstand the shearing, compressive, and abrasive abuse the seals must stand in their exposed position at the top of the coupling unit. The seal is made of a high durometer, high strength rubber and has an annular metal reinforcing ring moulded in it, the ring is flared outwardly for strength and the flared portion extends well into the rubber part of the seal to reinforce and give the rubber adequate strength to resist the water pressure and to resist peelback, tearing or displacement of the seal during the inevitable accidental abuse to which these seals are subjected. To enhance the sealing qualities of the high durometer rubber, reduced contact area geometry of the rubber with respect to those surfaces with which it mates and seals may be used.

To preclude costly and time consuming repairs to the seal or the seal seat at the end of the threaded portion of the tubular portion of the coupling unit, the annular metal reinforcing ring extends, in this example, rearwardly into the inside of the threaded portion past the retaining channel upon assembly. Retaining tabs spring radially outwardly from the reinforcing ring thereby engaging the retaining channel and securing the seal to the coupling threaded portion tip providing a readily replaceable seal.

DESCRIPTION OF THE PREFERRED EMBODIMENT

With specific reference now to the figures in detail, it is stressed that the particulars shown are by way of example and for purposes of illustrative discussion only and are presented in the cause of providing what is believed to be the most useful and readily understood description of the principles and structural concepts of the invention. In this regard no attempt is made to show structural details of the coupler apparatus in more detail than is necessary for a fundamental understanding of the invention, the description taken with the drawing making it apparent to those skilled in the art how the several forms of the invention may be embodied in practice. Specifically, the detailed showing is not to be taken as a limitation upon the scope of the invention, which is defined by the appended claims, forming, along with the drawing a part of this specification.

In FIG. 1, the example of the invention illustrated includes a pair of identical end coupler units 10, 12, each being affixed to a respective length of fire hose 14, 16. Each of the coupler units 10, 12 comprises a body member 18, 20 including an enlarged diameter tail portion 22, 24 which receives and holds the end of the hose lengths in a conventional manner. Forwardly of the tail piece, the body member includes a reduced diameter tubular portion 26, 28 which is terminated at its forward end by a threaded portion 30, 32 the maximum diameter of the threads of which is greater than that of the reduced diameter tubular portion. Thusly, a stopping shoulder 34, 36 is formed at the forward end of the tail portion in cooperation structurally with its respective reduced diameter tubular portion 26, 28; and a bearing shoulder 38, 40 is formed at the opposite or forward end of each of the reduced diameter tubular portions 26, 28 at the beginning or rear end of the threaded portions 30, 32 respectively.

Disposed over the body portion of each coupler unit is a rotatable nut or swivel member 42, 44. As will be more clear from the subsequent figures, each of the swivel members may be rotationally screwed rearwardly to abut the stopping shoulder of the tail portion, as shown in the case of the swivel member 42, with respect to the stopping shoulder 34 of the tail portion 22 to form an external coupler unit; or the swivel member may be screwed forwardly as illustrated by the axial disposition of the swivel member 44 to form an internal coupler unit.

Each of the swivel member may be provided with antibinding impact lugs 46 extending axially from either end thereof. Similarly impact lugs 48 are formed in the forward, stopping shoulder 34, 36 of each of the tail portions 22, 24. The structure of these impact lugs is shown more clearly in the subsequent figures. The function of the lugs is to preclude lock nut type binding of the swivel members with each other or with a respective one of the stopping shoulders 34, 36. Each lug, in this example, includes a riser impact surface lying substantially in a radial-axial plane so that if two relatively rotating elements contact, it is by direct circumferential abutment of those lug riser impact surfaces thereby precluding any circumferentially sliding and interthread binding contact.

Referring to FIG. 2, the coupler unit 10 is shown in enlarged, sectional detail as including the enlarged diameter tail portion 22 adapted by annular gripping serrations 50 for receiving and holding in a substantially conventional manner, the end of the length of hose 14. The fordward end of the tail portion forming the stopping shoulder 34 is shown with its impact lugs 48 in circumferential abuting engagement with the lugs 46 of the rear of the swivel member 42'.

The swivel member 42 includes a central tubular portion 52 having an inner diameter somewhat greater than the maximum diameter of the threads 30' of the threaded portion 30 of the coupler body member 18. The forward end of the swivel member 42 is a threaded portion 54, the threads of which mate with the threads 30' of the portion 30. The rear of the swivel member 42 is formed with a radially inwardly extending retaining shoulder 56 the forward bearing surface 58 of which conforms conically with the bearing shoulder 38 formed at the forward end of the reduced diameter tubular portion 26, and centering the swivel member 40, 42 about the threaded portion 30, 32.

The shoulder 56 of the swivel member 42 is, in this example, provided with a circumferentially continuous radially extending recess 119 of the character to retain an open loop of spring wire 120 contacting and slidable on the reduced diameter tubular portion 26 and engageable in either of the shallow slope sided grooves 121, 122 in the tubular portion 26 thereby securing the swivel member 42 in either the forward internal coupler position or the rearward external coupler position. When the swivel member 42 is intentionally moved rearwardly from the forward secured position or forwardly from the rearward position, the recess 119 pulls the loop of spring wire 120 axially forcing it to expand radially as it leaves the shallow slope sided grooves 121, 122. This configuration, in the secured position, secures the swivel member 42 out of the way when it is desired to use the unit as an external coupler and permits free spinning, true swivel and jam proof assembly or disassembly of the swivel member 42 when in the internal coupler position.

It should be noted that when the coupler unit 10 is to be utilized as an external coupler, the swivel member 42 is screwed rearwardly as far as possible, as shown, and that, in accordance with a presently preferred example of the invention, the threads 54' remain engaged as shown whereby the swivel member 42 is not rotationally free to spin clockwise about the tubular portion 26 but remains instantly ready to be converted to an internal coupler unit by spinning the swivel member counterclockwise; i.e. with the threads 30, 54' already engaged the operator does not need to pull the swivel 42 forward and to rotate it until the start of the threads mate to engage the threads before he is able to move the swivel member forwardly over the threaded portion 30. This relationship is obtained by causing the tubular portion 52 to be shorter than the tubular portion 26 but longer than the threaded portion 30. In this regard, it may be noted that all start threads 59 on both portions 30, 54 are shown referenced angularly to a notch 60 in the forward edge of a radially extending ridge or handle 62 for applying to it the engaging threads, so that an operator can most quickly engage the coupler units in poor light or under other adverse conditions of smoke, cold and wet environment, or emergency haste.

Contiguously to the end of the threaded portion 30 a shallow, enlarged diameter recess portion 68 is provided in the internal cylindrical surface 66 of the body member portion 30. The enlarged diameter recess portion, in this example, extends axially from the terminal or tip end of the body portion rearwardly ending in a conical shoulder or step 64. Formed within the enlarged diameter recess portion 68 is a retainer channel thread 70 which extends spirally from the tip end of the body portion 30 rearwardly well into the portion 68. This retainer channel thread 70 mates with a set of outwardly partially punched, forwardly directed, in this example, retaining teeth means 72 formed in the thin wall of a tubular reinforcing and retaining member 74 of the removable sealing member insert 76. It is to be noted and understood that the retaining teeth means 72 may, when desired be of appropriate hardness and sharpness that they form the retainer channel thread 70 as the removable sealing member insert 76 is screwed into the enlarged diameter recess portion 68 in the nature of a self tapping screw alternatively to preforming the retainer channel thread 70 as shown. The insert includes a body portion 78 and a forward, outwardly extending annular flange portion 80. A sealing ring member 82 formed of neoprene or rubber-like material with a density of preferably a minimum 75 durometer, which gives the necessary strength and abrasion resistance to the sealing ring member 82 which is in the exposed position at the forward end of the coupler body member 30, is bonded to the flange portion 80. Durometer, it is noted, is a measure of rubber density or hardness; greater durometer denoting greater density, greater strength, and greater abrasion resistance. To provide a seal of satisfactory durability under these conditions it has been found preferable to use high durometer rubber. High durometer rubber, however, does not conform or seal as well as low durometer rubber. To provide adequate sealing means, then, a circumferential continuous raised portion 123 on the forward face of the sealing ring member 82 is provided to reduce the contact area between mating seals thereby increasing the stress in the rubber and inducing deformation in the sealing ring member 82 forcing it to conform more completely regardless of irregularities or dirt inclusions and thus providing a superior seal. A conical portion 125 on the rearward face of the sealing ring member 82 seats into the conical recess portion 124 of the end of the coupler body member 30. The sealing ring member 82 both seals and resists the radially outward pressure of the fluid inside the coupler. The fluid pressure tends to force the sealing ring member 82 radially outward against the conical portion 124 thereby increasing the axial compressive sealing stress and creating, thereby, even greater sealing with increased pressure in the fluid being conveyed.

The entire insert 76 may thus be screwed into the enlarged diameter recess portion 68 or may be pushed axially into its seated position as shown, the retaining flanges 72 springing radially inward and then snapping into the retainer channel portion 70. For removal or replacement of the insert, the unit may be rotationally screwed outwardly.

It may be noted that, as pointed out above, the recess 68 as an enlarged diameter portion, per se, may be omitted, with, for example, the insert body portion 78 adapted to engage retentively the internal cylindrical surface 66 of the tubular portion 26 of the coupler unit.

Referring to FIG. 3, the coupler unit 10 is shown in its external configuration, that is with its swivel member 42 disposed in its most rearward position against the stopping shoulder 34, with the spring wire ring 120 securing the swivel member 42 by being retained by recess 119 and engaged in groove 121. In this configuration, the externally threaded portion 30 extends forwardly and free for coupling engagement by the second coupler unit 12 whose swivel member 44 is disposed and secured forwardly in an internal coupling position by the spring wire ring 120′ securing the swivel 42′ by being retained by recess 119′ and engaged in groove 122′ so that its threads 55 engage the threads 30′ and its bearing surface 58′ engages the bearing shoulder 40. When the two units thusly are fully screwed together, the sealing ring members 82, 83 carried at the tip ends of the respective units 10, 12 are compressively sealed together to complete the water-tight coupling of the hose lengths 14, 16 of FIG. 1.

In FIG. 4, the cross sectional view illustrates the angular configuration of each of the lugs 46 as well as their typical distribution about the end of the swivel member. The section taken also shows a small portion of tips of the lugs 48 on the tail piece portion 22.

Referring to FIG. 5, an alternative example of the sealing member insert is illustrated in which the enlarged diameter recess portion 68 is provided with a circumferentially extending retaining shoulder 100 which is not threaded and which, as shown, is engageable by a set of partially punched-out, forwardly directed tooth elements 102 formed in the body portion 104 of the insert 106. The conical rear face 125 of the sealing ring member 82 which seats in the conical recess 124, has a series of concentric grooves and ridges 127 to reduce the contract area between the conical rear face 125 and the conical surface of the recess 124 thereby increasing the stress in the ridges 127 deforming and conforming the rubber more to the conical recess 124 thereby further improving the seal between the mating parts. The annular flange portion 80 continues outwardly to near the edge of the sealing ring member 82. This provides greater strength to resist extrusion and rupture of the sealing ring member 82 by the water pressure. In an additional example of the sealing member insert 106, the outward corner 128 of the forwardly directed tooth elements 102 may be sharpened so as to form the retaining shoulder 100 by pressing into the recess portion 68. The remainder of the sealing insert member may be substantially like that of the previous figure. In operation, however, the insert 106 is necessarily pushed axially into place and is removed by a radially directed force on the body portion 104 which deforms the body portion 104 thereby disengaging the flange elements 102 from the retaining shoulder 100 sufficiently for withdrawal.

In FIG. 6, a further example of a replaceable sealing ring insert 110 is illustrated in which the rubber-like sealing ring member 112 is formed to include a peripherally continuous retaining lip 114 which engages, removably, a retaining shoulder 116 formed cooperatively, as shown with the forward edge of an annular retaining channel 118 contiguously to the tip end of the body portion of a coupler unit which may, in other respects, be substantially similar to those of the previous figures.

Referring to FIG. 7, an axial view of the securing ring 120 is shown, it is preferably made of slightly less than one loop of spring wire, other details of its operation and structure being discussed in connection with the description of FIGS. 2 and 3.

There have thus been disclosed and described a number of structural aspects of various examples of a novel identical half coupling system which achieves the objects and exhibits the advantages set forth hereinabove.

What is claimed is:

1. A conduit coupling apparatus of generally cylindrical configuration concentric about an axis, comprising:

a body having a rear portion and a forward connecting portion concentric about said axis and adapted for coopertively connecting with a connecting portion of other coupling apparatus, said body being formed to include an inner cylindrical surface concentric with said axis and communicating with said other coupling apparatus when said forward connecting portion is connected to said connecting portion of said other coupling apparatus, and said body including seal retaining means disposed circumferentially about and contiguously to said inner cylindrical surface concentrically therewith;

said rear portion having a large diameter portion and a reduced diameter tubular portion of first predetermined length joined to said large diameter portion and disposed axially between said large diameter portion and said forward connecting portion, the forward edge of said large diameter portion forming a rear stopping shoulder in cooperation with said reduced diameter tubular portion, said forward connecting portion having a threaded portion of second predetermined length said threaded portion having a maximum diameter somewhat greater than that of said tubular portion and being affixed thereto, the rear edge of said threaded portion forming a forward bearing shoulder in cooperation with said tubular portion;

a nut member adapted to be disposed over portions of said coupling apparatus body in a swivel freedom relation therewith about said axis and having a central tubular portion having an inner diameter larger, by a clearance magnitude, than said maximum diameter of said threaded portion;

a rear inwardly directed retaining shoulder portion affixed concentrically thereto and having an inner diameter less than said maximum diameter of said threaded portion and greater, by a clearance magnitude than that of said reduced diameter tubular portion whereby said retaining shoulder portion may be moved axially between said stopping shoulder of said larger diameter portion and said bearing shoulder; and a forward internally threaded portion the minimum diameter of which is less than that of said central tubular portion of said nut member, and which threadingly mates with said threaded portion of said body member, the length of said central tubular portion is greater than said second predetermined length and which further includes readily releasable means for releasably axially securing said nut member more forwardly whereby the forward face of said rear, inwardly directed retaining shoulder portion thereof is disposed contiguously to said bearing shoulder at said rear edge of said threaded portion of said coupling apparatus body, said coupling apparatus body being formed to define first and second shallow detent grooves disposed circumferentially continuously thereabout, said first groove being formed axially contiguously to said stopping shoulder and said second groove being formed axially contiguously to said bearing shoulder, and in which said nut member is formed to define an inwardly exposed retaining recess disposed circumferentially about the inner diameter portion of said rear retaining shoulder portion of said nut member, and in which said readily releasable means further includes circumferentially extending retainer spring means disposed radially flexibly between said retaining recess of said nut member and said reduced diameter tubular portion of said coupler apparatus body and being of the character adapted to engage releasably, alternatively, said first and second detent grooves.

References Cited

UNITED STATES PATENTS

| | | | |
|---|---|---|---|
| 184,723 | 11/1876 | Parsons | 285—12 |
| 658,692 | 9/1900 | Williams | 285—12 |
| 869,662 | 10/1907 | Snyder | 285—12 |
| 1,075,703 | 10/1913 | Eubank | 285—12 |
| 1,348,277 | 8/1920 | Gerrish | 285—12 |

FOREIGN PATENTS

| | | |
|---|---|---|
| 834,929 | 3/1952 | Germany. |
| 86,304 | 5/1936 | Sweden. |
| 170,171 | 5/1934 | Switzerland. |

THOMAS F. CALLAGHAN, Primary Examiner

U.S. Cl. X.R.

285—354